UNITED STATES PATENT OFFICE.

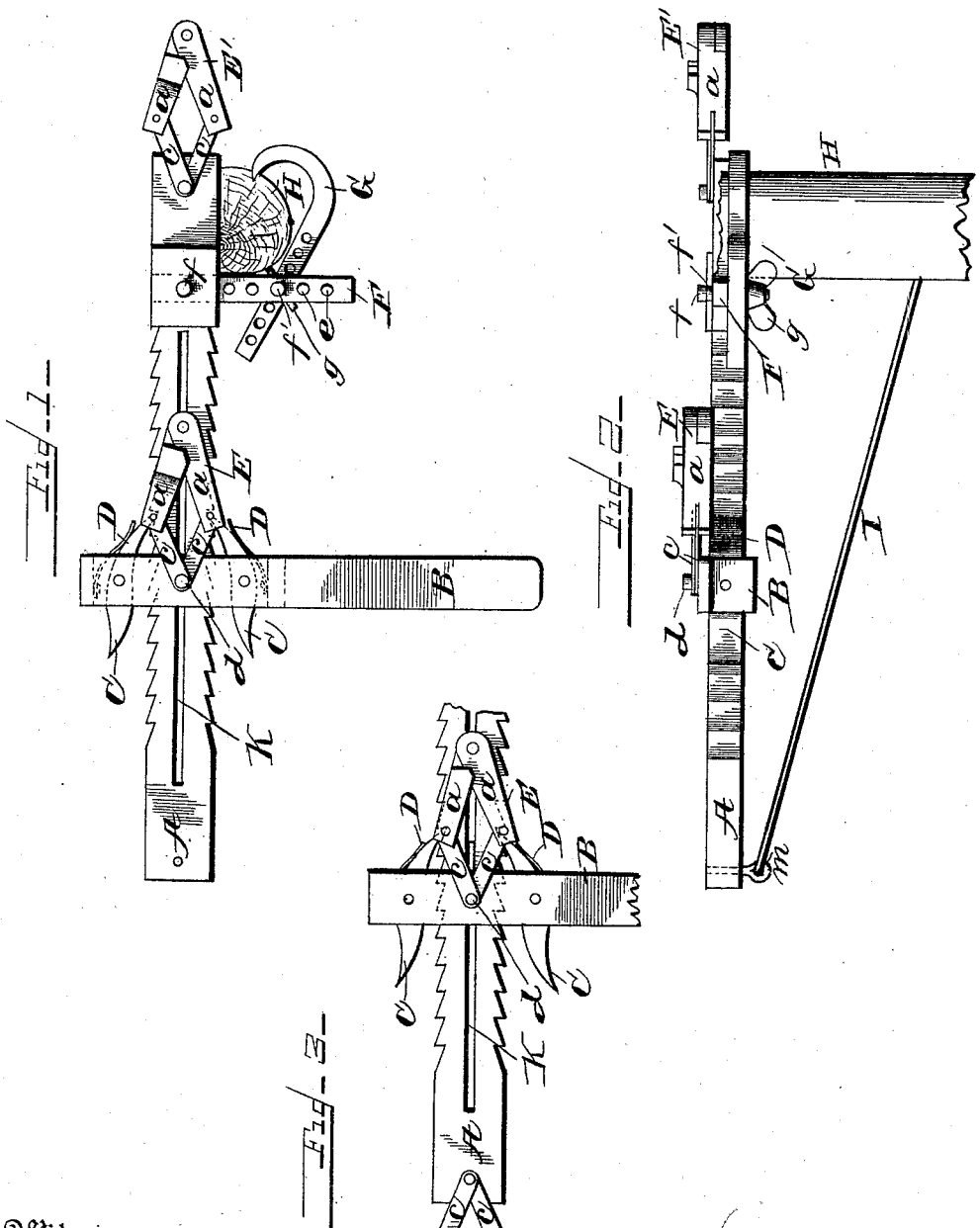

ANDREW McLEOD SHAW, OF LARKIN, KANSAS.

STRETCHER FOR WIRE FENCES.

SPECIFICATION forming part of Letters Patent No. 474,068, dated May 3, 1892.

Application filed July 1, 1891. Serial No. 398,154. (No model.)

*To all whom it may concern:*

Be it known that I, ANDREW McLEOD SHAW, a citizen of the United States, residing at Larkin, in the county of Jackson and State of Kansas, have invented certain new and useful Improvements in Stretchers for Wire Fences; and I do hereby declare the following to be a full, clear, and exact description of the invention, such as will enable others skilled in the art to which it appertains to make and use the same.

My invention relates to certain improvements in wire-stretchers for wire fences; and it consists in certain details of construction and arrangement of the several parts hereinafter more fully set forth in the specification, illustrated in the drawings, and pointed out in the claims.

In the accompanying drawings, Figure 1 is a top or plan view, and Fig. 2 a side elevation, of my stretcher attached to the post. Fig. 3 is a detail showing the arrangement of the clamps or wire-grippers when the device is employed for splicing wires.

Referring more particularly to the drawings, A is a metallic bar provided with a central longitudinal slot or opening K and ratchet-teeth on its parallel outer edges.

B is a lever provided near one end with a transverse slot or opening, by means of which it is slipped over and adapted to slide upon the bar A, which passes through said opening. C C are pawls, which are pivoted within said opening of the lever on opposite sides of the bar A.

D D are springs secured within the opposite ends of the slot in the lever B, which bear upon the outer ends of the pawls C and hold them in contact with the ratchet-teeth on the sides of bar A.

E E' are the wire clamps or grippers, constructed on the lazy-tongs principle and consisting of the short outer bars $a\, a$, pivoted together at one end, where the gripping-jaw is formed, and having their opposite ends pivoted to the ends of similar short bars $c$, the outer ends of said bars $c$ being pivoted together. I provide two of these grippers, one of which E is movable along the bar A, being attached to the lever B. The other E' is fixed at one end of the bar A.

At the forward end of the slot or opening K is a transverse slot or groove (shown in dotted lines of Fig. 1) through the bar A, which is occupied by a bar F, provided with holes or openings $e$. This bar is secured within the transverse slot of the ratchet-bar A by a pin $f$, passing through the latter and one of the holes $e$. To this bar is secured a dog or hook G by a similar pin $f'$, which is threaded and provided on its outer end with a thumb-nut $g$. (Shown in Fig. 2.) This dog or hook G is designed to engage the post H, and by means of the holes or openings $e$ and pin $f'$ may be adjusted along the bar F to any-sized post. The hook G is also provided with holes similar to those in bar F, whereby it is made still further adjustable. By means of this hook and its adjustable connection with bar F it will be observed that my stretcher is brought in line with the face of the post to which the wire is secured, causing a straight or direct tension along the line of wire.

I is a rod secured at one end of the bar A by an eyebolt $m$ and adapted to be driven into the post, as shown in Fig. 2, for the purpose of supporting the stretcher in position.

Having thus described the various parts of my device, I will proceed to describe its operation. In constructing or stretching a wire fence my device is secured or attached to the post along the front face thereof by means of the adjustable hook G and its connections and supported and secured in position by the rod I, as shown in Fig. 2. The wire is then brought through the gripper E and the lever B, carrying the pawls and gripper, is worked back toward or to the rear end of the ratchet, when, if the wire is not sufficiently stretched, the gripper E' is clamped upon the wire and serves to hold it in its stretched position, while the gripper E is released and with the lever and pawls again moved to the forward end of the slot K, when the operation may be repeated until the wire is sufficiently taut. When it is desired to splice a wire, the operation is varied as follows: The gripper E' is removed from the front end of the bar A and attached at the rear end by the eyebolt holding-rod I, as shown in Fig. 3. The ends of the wire to be spliced are then brought between the grippers and seized by them, and are brought together by working back the ratchet-lever B, carrying the pawls C and gripper E, as before, when they may be readily spliced.

Having thus described my invention, what I claim, and desire to secure by Letters Patent, is—

1. In a wire-stretcher for fences, the centrally-slotted double-ratchet bar provided with a ratchet-lever movably secured to and adapted to slide on said bar and carrying spring-controlled pawls and an automatically-operated wire-gripper, in combination with the adjustable holding device consisting of the perforated horizontal bar adjustably secured in a transverse slot or opening of the ratchet-bar and a perforated dog or hook adjustably secured to said bar, whereby the side of the ratchet-bar is brought in contact with and maintained on a line with the front face of the post, substantially as described.

2. The combination, with the centrally-slotted double-ratchet bar provided with the movably-secured ratchet-lever carrying the spring-controlled pawls and the automatically-operating wire-gripper and with the hooked supporting-rod, of the adjustable holding device consisting of the perforated horizontal bar adjustably secured in a transverse slot or opening of the ratchet-bar and a perforated hook adjustably secured to said bar, substantially as described.

3. The combination, with the slotted double-ratchet bar provided with the movable ratchet-lever adapted to slide thereon and carrying the spring-controlled pawls and wire-gripper and with the fixed automatically-operating gripper at one end, of the adjustable holding device consisting of the perforated horizontal bar adjustably secured in a transverse slot or opening of the ratchet-bar and a perforated hook adjustably secured to said bar, substantially as and for the purpose set forth.

4. The combination, in a stretcher for wire fences, of the slotted double-ratchet bar, the ratchet-lever movably secured thereto and carrying the spring-controlled pawls and wire-gripper, the fixed automatically-operating wire-gripper secured to one end, the supporting and holding rod, and the adjustable holding device consisting of the perforated horizontal bar adjustably secured in a transverse slot or opening of the ratchet-bar and a perforated dog or hook adjustably secured to said bar, all combined and arranged substantially as and for the purpose described.

In testimony whereof I affix my signature in presence of two witnesses.

ANDREW McLEOD SHAW.

Witnesses:
R. L. THOMPSON,
I. J. HEDRICK.